Aug. 7, 1956   G. A. MOORE   2,757,851
CONTAINERS
Filed March 21, 1952   6 Sheets-Sheet 1
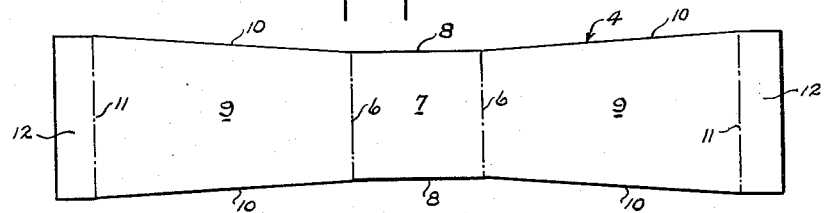
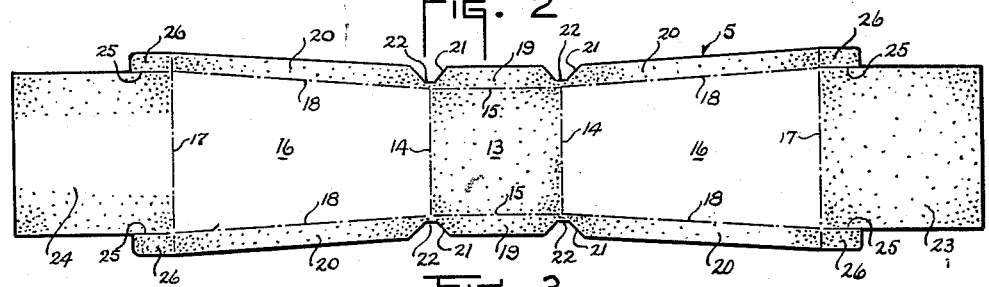
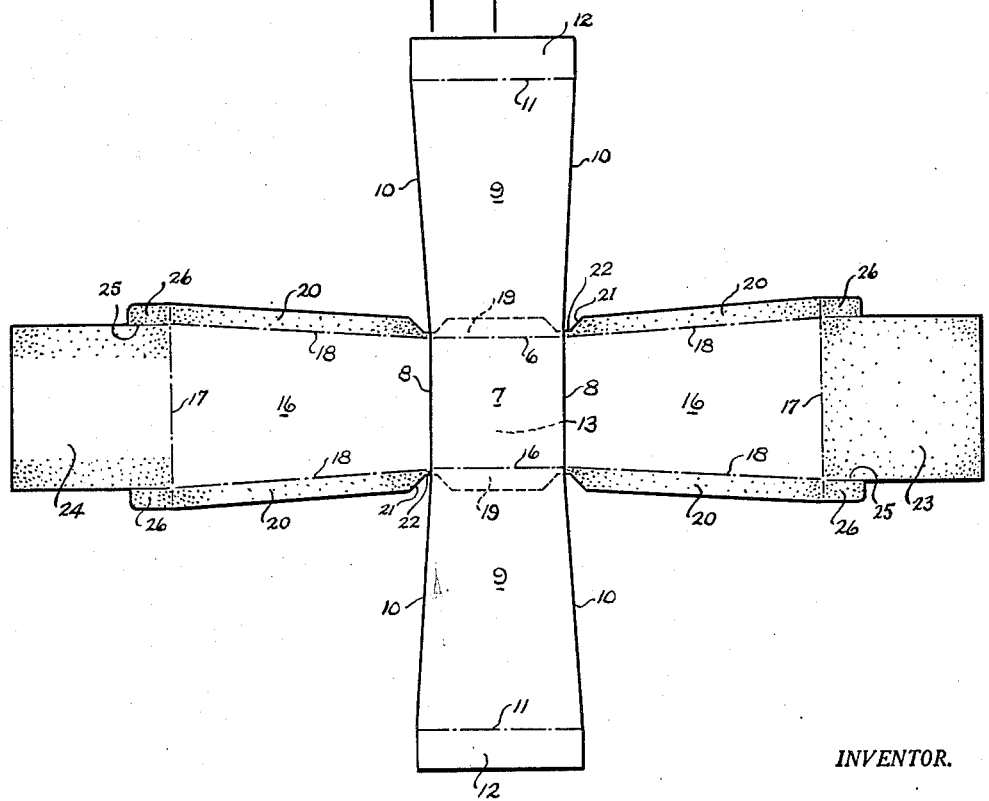
INVENTOR.
George Arlington Moore

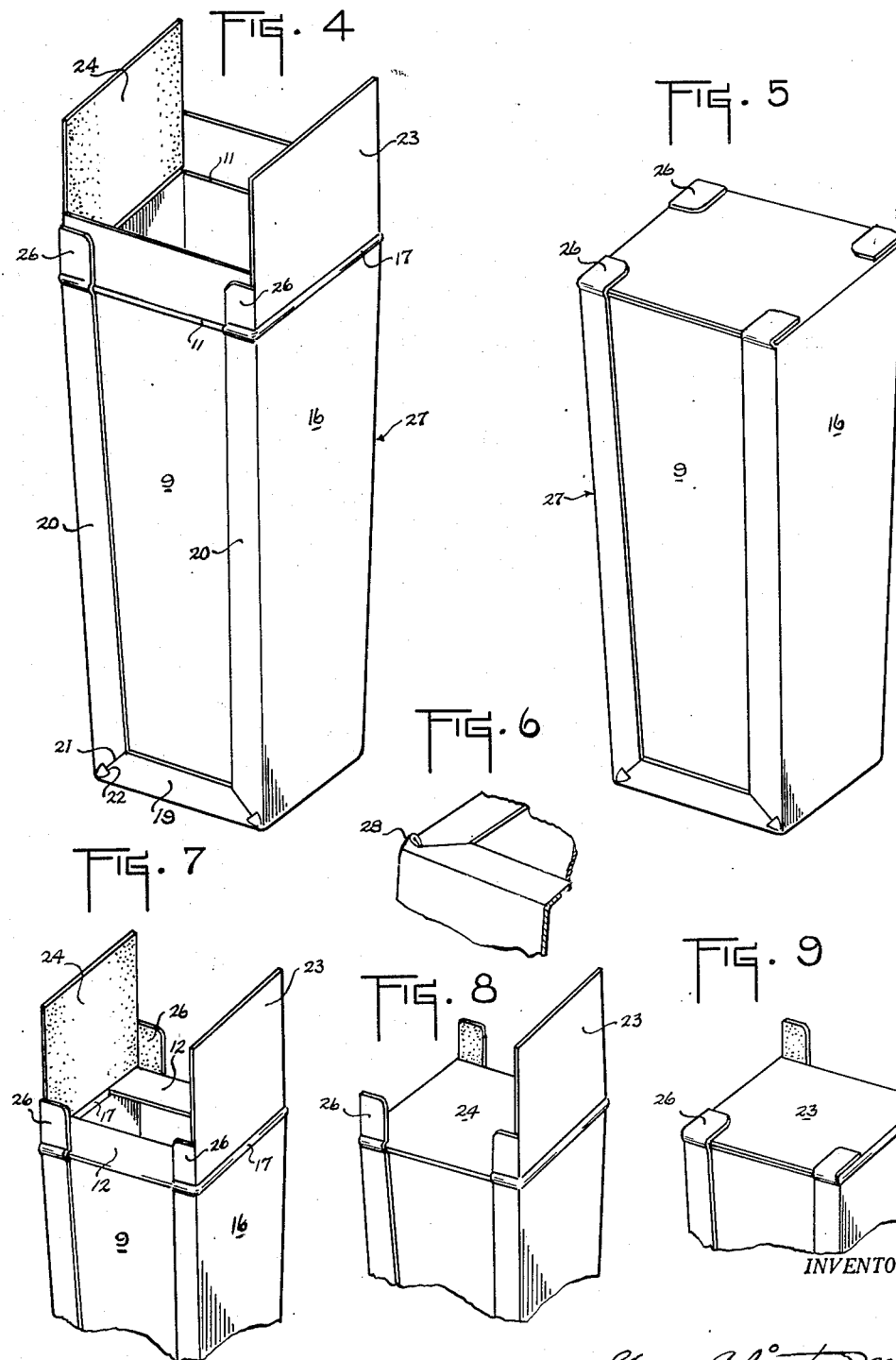

Aug. 7, 1956  G. A. MOORE  2,757,851
CONTAINERS
Filed March 21, 1952  6 Sheets-Sheet 3
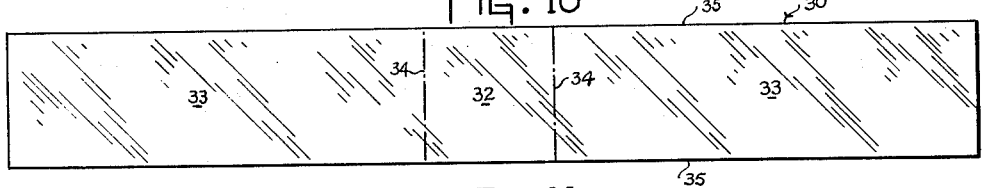
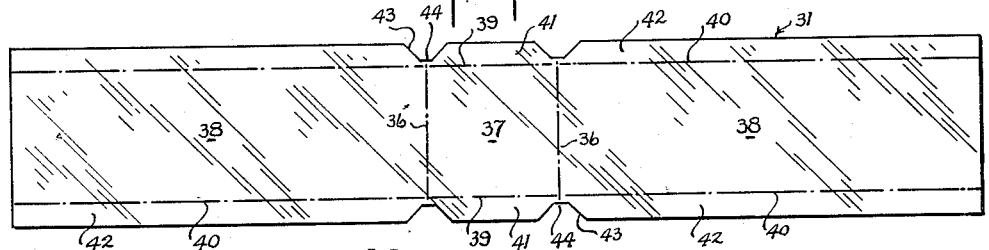
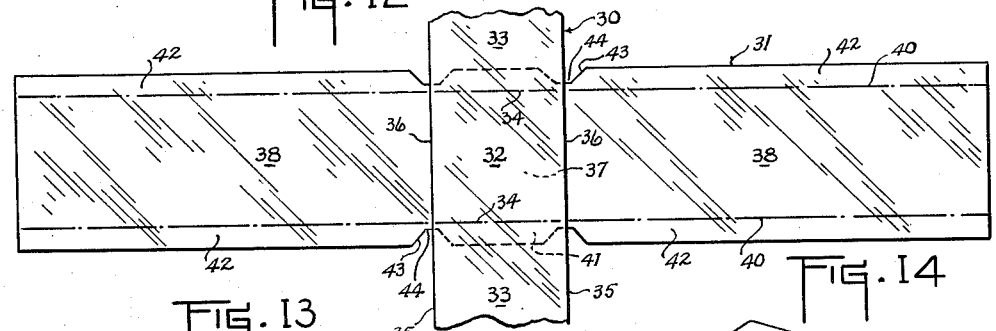
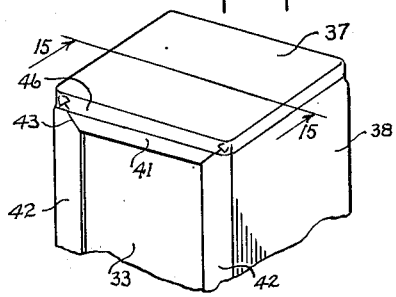
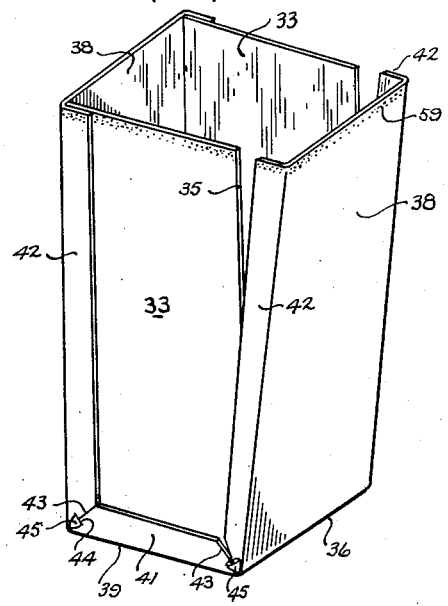
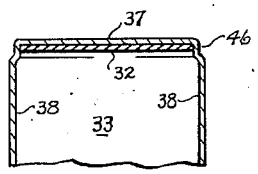
INVENTOR.
George Arlington Moore

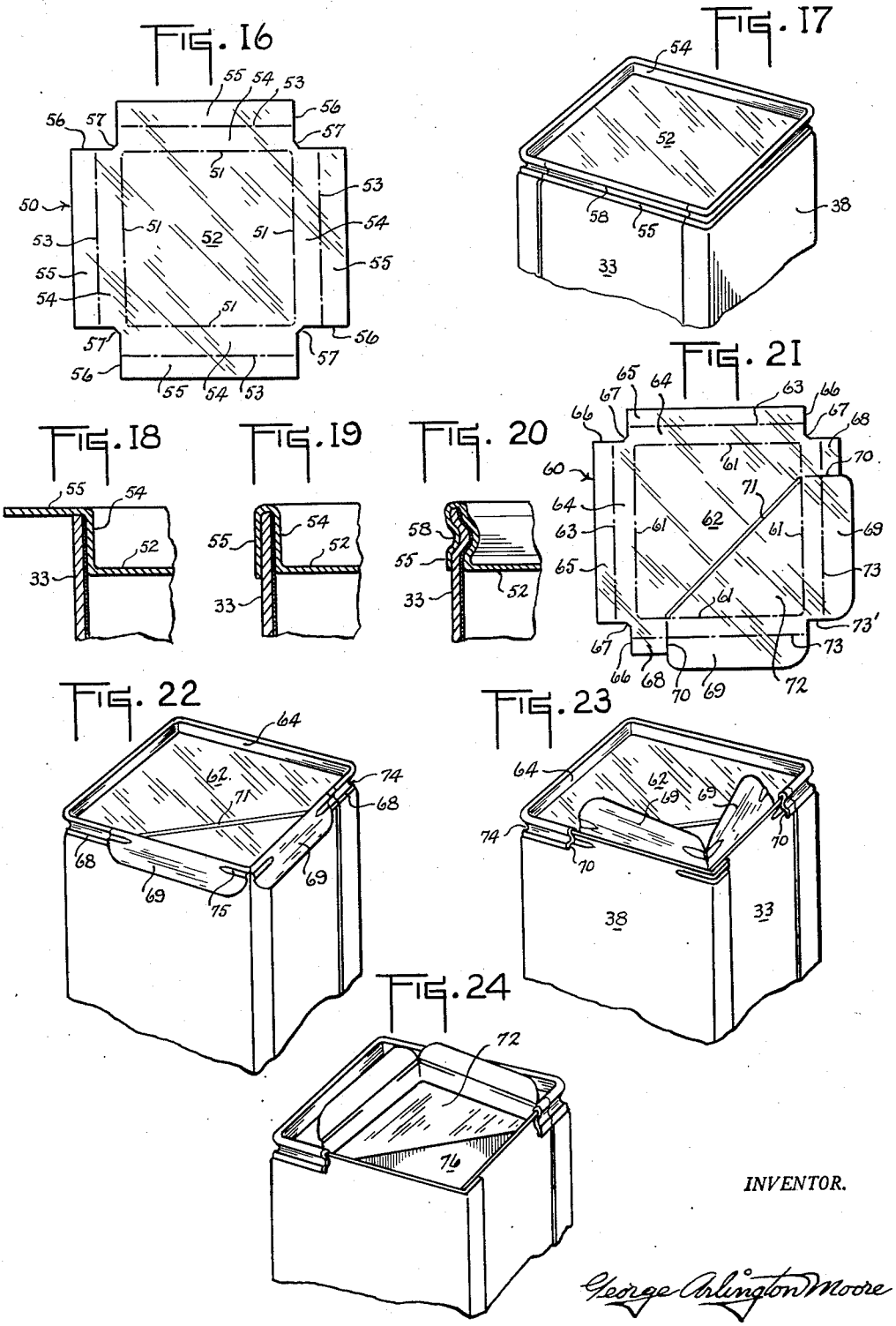

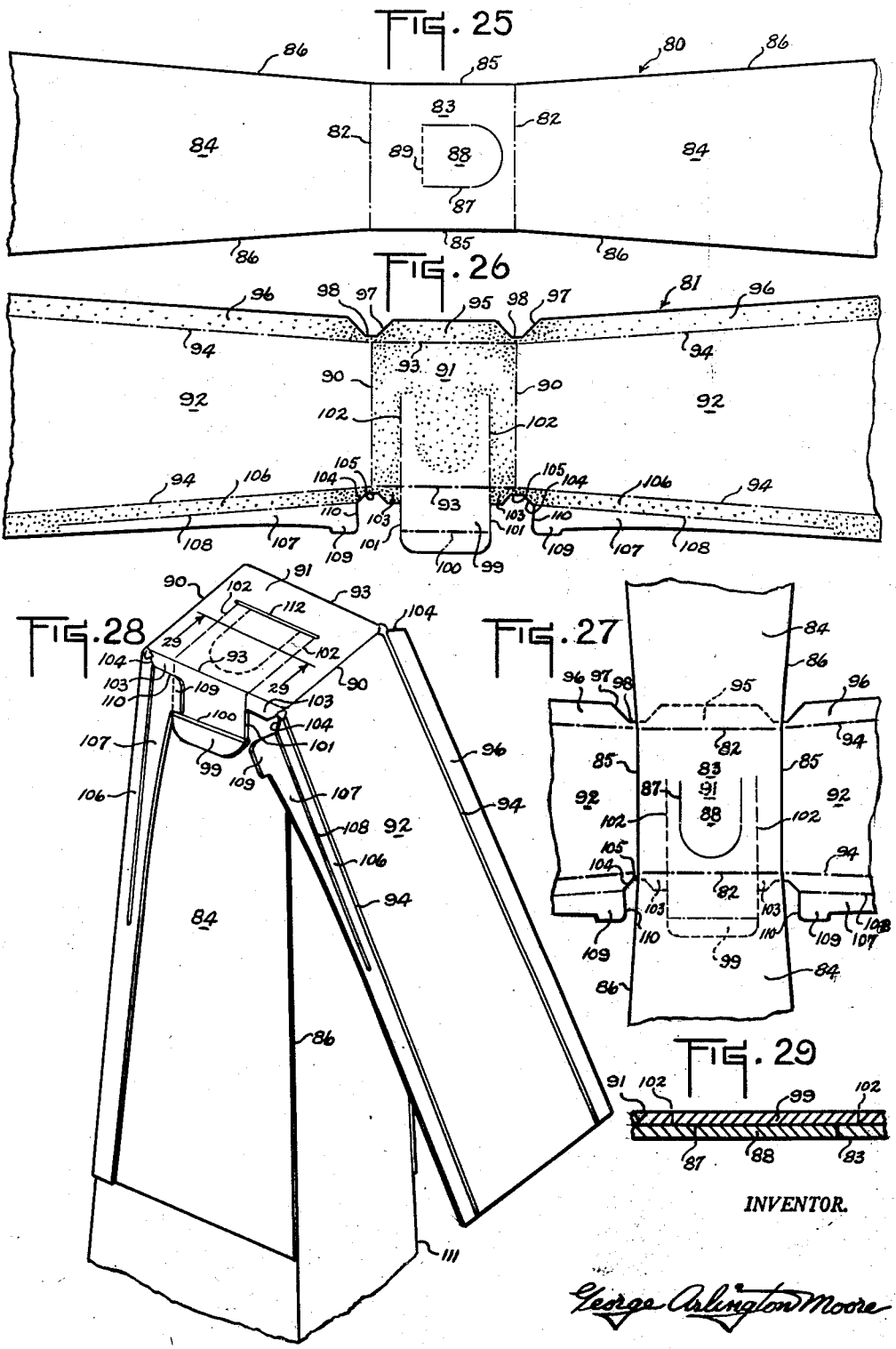

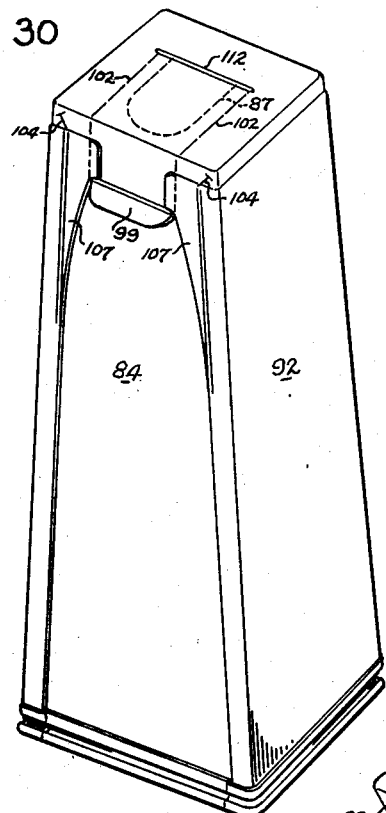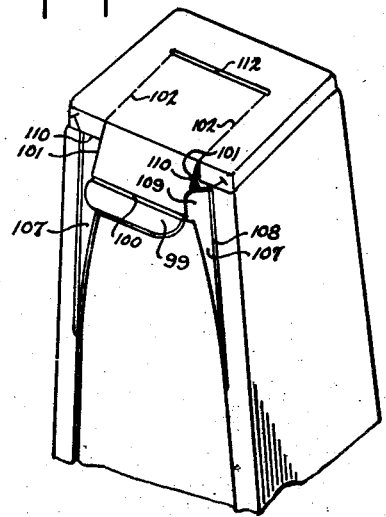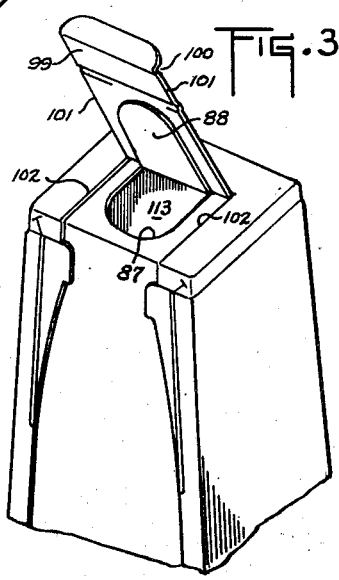

United States Patent Office 2,757,851
Patented Aug. 7, 1956

2,757,851

CONTAINERS

George Arlington Moore, New York, N. Y.

Application March 21, 1952, Serial No. 277,800

7 Claims. (Cl. 229—23)

This invention relates to containers and is more particularly concerned with improvements in containers formed of a plurality of generally elongate blanks of relatively rigid or semi-rigid material which are assembled and connected in such a manner that they form a hermetically sealed enclosure adapted for efficient packaging of a variety of merchandise.

This application is a continuation-in-part of my application Serial No. 245,702, filed September 8, 1951, now abandoned.

In fabricating containers for use in packaging many products such as liquids, semi-liquids and other products, which require a relatively strong, light container capable of being properly sealed after filling, difficulty has been experienced in providing, with sufficient economy of materials, a leak-proof, hermetically sealed structure which may be filled with the desired material and sealed in simple, inexpensive machinery. Generally it has been found that a container which is satisfactory for the product which it is intended to package is too expensive to produce or use, either because of the amount or nature of the materials from which the container is fabricated, or because complicated and expensive machinery is required for its manufacture or for filling it with the desired merchandise and providing a satisfactory closure.

It is a general object of the present invention to provide a container fabricated from sheet material of various types, which container is substantially self-sustaining when it is in set-up condition, which is relatively strong and light, which is so constructed that it is adequately sealed at all seams, and which, when filled, may be readily closed and provided with an hermetic closure seal.

It is a more specific object of the invention to fabricate a container from a pair of generally rectangular blanks of cut and scored sheet material, which blanks are arranged with the central portions in superimposed crossed relation and sealed together throughout the superimposed areas to form a double ply end wall structure, the integral end portions of each blank being folded into upstanding side wall forming relation with side marginal portions of the one blank being folded over into edge encompassing face engagement with the outside surfaces of the other blank and being sealed thereto, whereby a container is provided having a smooth interior surface with no exposed edges.

It is another object of the invention to form a container of the character described wherein excess material is provided at the corners formed by the juncture of the integral side and end walls, which material is flattened and compressed in sealed relation to form a reinforced corner structure.

It is a further object of the invention to provide a container formed of generally rectangular crossed blanks, in which one of the blanks is provided with marginal side edge portions which are adapted to be folded over into face engagement with the outside surfaces of the other blank and sealed thereto in seam forming relation, the side edge portions being cut away in the areas adapted to form the corners of the container to provide a generally V-shaped or triangular notch with a blunt apex which does not extend to the corner forming fold lines whereby excess material is provided at the corners which is compressed and sealed in the process of forming the container to reinforce the corner.

It is another object of the invention to provide a container fabricated from elongate generally rectangular blanks of foldable sheet material which blanks are divided by transverse score lines into a central end wall forming panel and integral side wall forming panels, one of the blanks having longitudinal score lines defining marginal side edge portions adapted to be folded over into face engagement with the marginal edges of the other blank and truncated V-shaped notches in the side edge portions embracing the ends of the transverse score lines which notches terminate short of the longitudinal score lines whereby to permit formation of a mitered joint at the outer extremity of the edge portions with excess material adapted to be compressed and sealed at the intersecting corner fold lines.

It is another object of the invention to provide a container formed from elongate blanks of sheet material which are crossed and sealed in face-engaging relation at a central area to form the container end closure with end portions of the blank turned upwardly therefrom and connected at the edges to form the container side walls, wherein the blanks are provided on the inner surfaces with a sealing medium to seal the seams and afford a smooth integral inner surface devoid of any exposed edges of the blank material.

Still another object of the invention is to provide a container of the type described in which the blank material is characterized by an inner surface of thermoplastic material which is adapted to form when activated an integral bond between overlapping portions of the blank material and a continuous integral inner surface constituting a barrier to the passage of moisture.

A further object of the invention is to provide a container of the type described wherein the ends of the crossed blanks are provided with end closure forming flap portions which are adapted to be folded and sealed in overlapped relation to form a multi-ply reinforced closure for the container.

Another object of the invention is to provide in a container of the type described an improved pouring spout, which may be opened and closed repeatedly and which will protect the contents of the container in an efficient manner, when the container is used for merchandising liquids, such as dairy products, or the like.

Another object of the invention is to provide a rigid or semi-rigid container of the type described in which the body walls are tapered so that in the open condition a plurality of the containers may be nested for shipment and storage.

These and other objects of the invention will be apparent from a consideration of the several forms of containers which are shown by way of illustration in the accompanying drawings, wherein:

Figs. 1 and 2 are plan views of sheet material blanks cut and scored preparatory to the formation of a container embodying the principal features of the invention;

Fig. 3 is a plan view of the blanks as they are initially assembled prior to folding the same about a forming mandrel;

Fig. 4 is a perspective view of the completed container with the bottom forming or filling end open;

Fig. 5 is a perspective view of the container completely closed and sealed;

Fig. 6 is a fragmentary perspective view showing a corner of the container in folded condition but prior to the pressing and sealing operation;

Figs. 7, 8 and 9 are fragmentary perspective views showing the steps involved in closing and sealing the filling end of the container;

Figs. 10 and 11 are plan views of sheet material blanks cut and scored preparatory to assembling and folding the same to provide a modified form of the container;

Fig. 12 is a fragmentary plan view of the blanks of Figs. 10 and 11 as initially assembled in crossed relation;

Fig. 13 is an isometric view showing the manner of folding the assembled blanks of Fig. 12 to form the container;

Fig. 14 is a fragmentary perspective view of the closed end of the container;

Fig. 15 is a section taken on the line 15—15 of Fig. 14;

Fig. 16 is a plan view of a cut closure blank for capping or closing the open end of the container of Fig. 13;

Fig. 17 is a fragmentary perspective view of the capped or closed end of the container of Fig. 13;

Figs. 18, 19 and 20 are fragmentary sections illustrating the steps involved in applying the closure cap to the container top;

Fig. 21 is a plan view of a sheet material blank cut and scored for forming a modified closure cap for the container which has incorporated therein a dispensing opening;

Fig. 22 is a fragmentary perspective view of the container with the closure cap of Fig. 21 applied thereon;

Figs. 23 and 24 are fragmentary perspective views similar to Fig. 22 showing the steps involved in breaking the seal and folding back a portion of the closure cap to provide a dispensing opening;

Figs. 25 and 26 are plan views of sheet material blanks cut and scored preparatory to the formation of another modification of the container which has incorporated therein a dispensing opening;

Fig. 27 is a fragmentary plan view of the blanks of Figs. 25 and 26 assembled in crossed relation;

Fig. 28 is a perspective view of the blanks partially folded about a forming mandrel;

Fig. 29 is a fragmentary section taken on the line 29—29 of Fig. 28;

Fig. 30 is a perspective view of the completely formed container with a closure cap applied to the filling end, the dispensing end being shown uppermost; and Figs. 31 and 32 are fragmentary perspective views showing the breaking loose and folding back of the end wall portions of the container to provide the dispensing opening.

Referring to Figs. 1 to 9, there is illustrated a container (Figs. 4 and 5) formed from a pair of generally rectangular sheet material blanks (Figs. 1 and 2) which are cut and creased to divide the same into a plurality of wall forming panels, the blanks being initially assembled in crossed relation (Fig. 3) and thereafter folded into container forming relation with portions of the side margins of the blanks in overlapped seam or closure forming position and with overlapping seam forming portions being sealed to provide integral end and side walls and with end closure flaps (Fig. 4) which are adapted to be folded and hermetically sealed after the container is filled with merchandise (Fig. 5).

The blank material employed may be any suitable kind of sheet material such as sheets formed of fibers, metals, plastics, resins or combinations thereof which have sufficient flexibility to permit the necessary folding or bending operations, which will form relatively rigid or semi-rigid containers, and which will permit the formation of bonded seam structures and hermetically sealed closures. Preferably, the blanks are formed of fiber board from 0.012 to 0.016 inch thickness, or other sheet material, such as aluminum foil from 0.002 to 0.004 inch thickness.

Referring particularly to Figs. 1 and 2 of the drawings, the pair of blanks 4 and 5, which are illustrated, are generally rectangular and symmetrical about their longitudinal and transverse center lines.

The blank 4 (Fig. 1) is cut and divided by transversely extending longitudinally spaced score lines 6—6 to provide a central panel 7 having oppositely disposed parallel side edges 8. Side wall forming panels 9 extend from the transverse crease lines 6 in opposite directions on each side of the central panel 7. The longitudinal side edges 10 of the side wall panels 9 have a slight taper outwardly from the central panel 7. The side wall panels 9 terminate at transverse score lines 11 which are spaced inwardly of the end edges of the blank. Flap forming marginal end portions or panels 12 extend from the transverse score lines 11 to the end edges of the blank.

The companion blank 5 (Fig. 2) is cut and creased or scored to provide a central panel 13 which is defined by transversely extending longitudinally spaced score lines 14 and transversely spaced longitudinally extending parallel score lines 15, the latter being spaced inwardly of parallel straight side edge portions at the center of the blank. Side wall forming panels 16 extend longitudinally in opposite directions from the score lines 14 to transverse score lines 17. The panels 16 are defined along the side edges by outwardly tapered longitudinally extending score lines 18 which are spaced inwardly from and parallel with tapered side edge portions of the blank. The marginal areas between the crease lines 15, 18 and the side edges of the blank are divided longitudinally into central or end edge connecting flanges 19 and side wall edge connecting flanges 20. The flanges 19 are separated from the adjoining flanges 20 by generally V-shaped notches or cut-outs 21 which are located at the ends of the transverse crease lines 14. The notches 21 are generally triangular in shape with blunt apexes 22. The notches 21 do not extend to the marginal score lines 15, 18 but the blunt apexes 22 thereof terminate a predetermined distance outwardly of these score lines. Closure flap forming panels 23 and 24 extend outwardly of the transverse score lines 17 at opposite longitudinal ends of the blank. The closure flaps 23 and 24 are the same width as the outer ends of the side wall panels 16 from which they extend and are separated by longitudinally extending cutting lines 25 from relatively small corner reinforcing flaps 26, the latter extending longitudinally of the side wall edge flanges 20 and being adapted to fold about the extended ends of the transverse score lines 17. The central panel 13, edge connecting flanges 19, 20 and closure forming flaps 23 and 24 are preferably covered with a coating of a thermoplastic adhesive which may be a lacquer formed from nitro and ethyl cellulose with a suitable plasticizer or any suitable hot-melt compound. Coatings of vinyl resins have been found particularly suitable.

In forming the container from the blanks 4 and 5 the blanks are initially arranged in crossed relation (Fig. 3) with the central area 7 of blank 4 in superimposed relation on the adhesive coated side or face of the central area 13 of blank 5, and with the edges 8 of blank 4, which define opposite sides of the central area 7, coinciding with the transverse score lines 14 of blank 5, which define opposite sides of the central area 13. The tapered edges 10 of the blank 4 extend from the ends of the edges 8 and pass approximately through the centers of the blunt apexes 22 of the notches 21 in blank 5. With the blanks 4 and 5 assembled in the relative position shown the central areas 7 and 13 are sealed to each other, preferably by the application of heat and pressure which activates the thermoplastic adhesive between the contacting surfaces. The flange portions 19 of blank 5 are left unsealed.

The assembled blanks 4 and 5 with the end forming central areas 7 and 13 sealed to each other are then folded and shaped to form container 27 (Fig. 5) in the following manner. The panels 9 of blank 4 which constitute end extensions integral with the central panel 7 are folded upwardly into side wall forming relation about the score or fold lines 6. The panels 16 of the blank 5 which constitute integral extensions of the central panel 13 are folded upwardly into side wall forming relation about the score lines 14, the inner faces of these panels engaging in abutting relation with the tapered edges 10 of the panels 9. The marginal edge connecting flange forming portions 19 and 20 of blank 5 are folded about the score lines 15 and 18 into face engagement with the marginal portions of the outer faces of wall forming panels 9, the flanges 19 extending along two bottom or end edges or corners of the container and the flanges 20 extending along the upright or vertical edges or corners of the container. The notches 21, which are located at the four corners of the end wall formed by panels 7, 13, are closed by the folding of the flanges 19 and 20 so that the side edges thereof abut and form a tight mitered corner between the adjoining flanges with excess material 28 provided by the blunt apexes 22 which tends to bulge outwardly as indicated in Fig. 6. Heat and pressure are applied over the surfaces of the flanges 19 and 20 to activate the thermoplastic adhesive and seal the contacting surfaces thereof to the wall forming panels 9. During this operation, the excess material 28 provided by the blunt apexes 22 when the notches 21 are closed, is forced inwardly to spread against the portions of the adjoining edges of the side walls adjacent the end of the container. The excess material 28 is compressed to form a neat contour substantially flush with the adjoining surfaces of the flanges 19 and 20 (Figs. 4 and 5). Since the notches 21 terminate at the blunt apexes 22 and short of the fold lines 15 and 18 the excess material 28 occurs at and is compressed into the corners at the point where damage is most likely to be inflicted during subsequent handling of the container. The blunt apex construction reinforces and strengthens the corners at the points of greatest vulnerability, where it is needed most to prevent the undesirable leakage at the corners which frequently occurs in containers having conventional corner construction.

The closure flaps 23, 24 and the corner flaps 26 are not heated during the sealing of the flanges 19 and 20, but are left in extended position as shown in Fig. 4 for the filling of the container with the desired contents. The completely formed and empty container 27 is readily adapted to be treated with wax to render the fiber board more liquid proof, if desired. A mixture of microcrystalline and paraffin wax is suitable for this purpose.

After the container 27 is filled the end closure flaps 12 are folded inwardly on score lines 11 (Fig. 7), the side walls of the container being preferably confined in a holder or contracting chuck (not shown) which firmly engages the upper portions of the walls 9 and 16 and which terminates at score lines 11 and 17. The flaps 23 and 24 are folded inwardly about the score lines 17 (Fig. 8), the adhesive coated face of flap 23 engaging the upper surfaces of the flaps 12 and the adhesive coated face of flap 24 engaging in turn the upper face of the flap 23. All of the closure flaps tend to resist the folding and to spring outwardly due to the bending resistance in the material. With the flaps in folded position as described sufficient heat and pressure is applied, to affect the seal. By closely engaging the top portions of the container side walls with the holding chuck and properly positioning the top edges of the lower base lines of the scores or folds 11 and 17, the material at the folds will project slightly over the edge and rest on the top of the holding chuck, sufficient to resist the downward sealing pressure, and to obtain an efficient seal.

Heat and pressure are applied over the entire surface of the outer closure flap 24 during the end sealing operation and when the heating irons are retracted there is sufficient heat in the flap 24 to activate the adhesive on the corner flaps 26 which are immediately folded over upon the outer surface of flap 24 (Fig. 9). The flaps 26 reinforce the container at the four corners of the end wall or closure (Fig. 5) and also serve as base pads upon which the container will stand when the container is upright and end closure is positioned to serve as the container base.

In the modified form of the container illustrated in Figs. 10 to 15 of the drawings, two elongate generally rectangular blanks 30 and 31 are provided. The blank 30 is of fibrous material and/or aluminum foil having a thermoplastic or resinous film or coating on its face. The coating may be extruded polyethylene film which is impervious to moisture, oil, grease or fatty acid penetration. The blank 30 is divided into a central panel 32 and two identical end panels 33 by transversely extending parallel score lines 34, the end panels 33 extending from the score lines 34 to the ends of the blank. When the blank 30 is of fibrous material, its side edges 35 are coated with a resinous compound of the same material as upon its face or with another material compatible with the same.

The companion blank 31 in Fig. 11 is of the same material as blank 30 and is divided by longitudinally spaced transverse score lines 36 into a central panel 37 and two end panels 38 extending from the score lines 36 to the end edges of the blank. Parallel inwardly spaced longitudinal extending score lines 39 and 40 define the side edges of the panels 37 and 38. The side marginal edge portions between the score lines 39, 40 and the side edges of the blank are divided into a central portion 41 and end portions 42 by V-shaped notches 43 having blunt apexes 44. The notches 43 are positioned at the ends of the transverse score lines 36 with the blunt apexes 44 terminating short of the longitudinal score lines 39, 40.

The blanks 30 and 31 are assembled in cross relation as shown in Fig. 12 with the central panel portions 32 and 37 in superimposed relation. The end panels 33 are first folded upwardly around the score lines 34 after which the end panels 38 are folded upwardly about the score lines 36 to bring the side edges 35 of the panels 33 into edge to face abutting relation with the panels 38. The marginal edge formations or flanges 41, 42 of the panels 37, 38 are then folded into face engaging relation with the adjacent portions of the panels 33 of the blank 30. Heat and pressure are applied to activate the adhesive coating on the surfaces of the flanges 41, 42 to seal the same into face engaging relation with the outer face portions of the panels 33. The heat and pressure applied activates the adhesive on the edges 35 of the panels 32 and 33 and seals the same to the faces of the panels 38. The crossed blanks 30 and 31 are adapted to be folded on the end of a suitable mandrel and the heat and pressure necessary for the sealing of the seams is adapted to be applied by means of sealing irons to the outside walls or surfaces of the blanks. The notches 43 in the marginal edge portions close with the folding operation and the blunt apexes 44 form an excess of material 45 (Fig. 13) for the sealing operation. In sealing the overlapped central panels 32 and 37 and compressing the excess material 45 provided at the corners, a sealing iron or mechanism is employed which extends around the edges of the bottom closure, or end, formed by the panels 32 and 37, and which is contracted slightly to compress the material and form a depressed margin 46 around the periphery of the container. At the corners where the excess material 45 is provided the material is compressed. The heat in the forming or sealing irons activates the adhesive coating on the inner surfaces of the blanks and when the material cools it is set in the contracted or compressed condition as shown in Fig. 15. This completes the formation of the body of the container and leaves it in condition where the inner walls present smooth uninterrupted surfaces and the corner edges are fused to opposing walls. The completely formed container is open at the top and is adapted to receive a separate top closure.

A suitable closure blank for this type of the container is shown in Fig. 16. The blank 50 may be formed of the same material as the body blanks 30 and 31, having a coating upon its surface which has thermoplastic properties. The blank 50 is scored on the lines 51 which define a central panel portion 52 substantially the same size as the central panel 33 of the blank 30. A marginal portion of substantial width extends between the score lines 51 and the edges of the blank 50 which is further subdivided by the score lines 53 into two substantially equal flange forming portions 54 and 55. At the corners the blank 50 is cut or notched out with notches 56 each having a blunt apex 57 which terminates short of the intersection of the score lines 51, leaving additional material for effectively closing the corners during the closing or capping operation.

The closure blank or cap 50 is assembed with and secured on the open end of the container by folding the marginal edges upwardly about the score lines 51 and inserting the central panel 52 within the open end of the body of the container (Fig. 18). The inner flanges 54 of the marginal section of the blank are engaged with the inner marginal surfaces of the wall panels 33 and 38 while the outer flanges 55 are folded outwardly and downwardly over the top marginal edges of the container into engagement with the outer surfaces of the body panels 33 and 38 (Fig. 19). With the marginal portions of the closure cap 50 positioned as shown in Fig. 19 sealing and compressing irons are applied to the upstanding flange thus formed on the top of the container to seal the adhesive coated surfaces of the closure blank to the marginal edges of the walls of the container and to form therein a groove 58 which reinforces the edges of the container (Figs. 17 and 20).

When it is desired to use the container for a special purpose, such as for lubricating oil, a somewhat different material may be employed in the closure cap. It is preferable to form the cap of aluminum sheet material from .003 to .004 inch thickness. The aluminum cap enclosure is formed and applied in the same manner as described above. If the aluminum closure is not provided with a thermoplastic surface coating or a film of adhesive material it is desirable to provide a border of dry thermoplastic adhesive 59 (Fig. 13) on the external marginal edges at the top of the open mouthed container which may be activated by the sealing tools to further adhere the aluminum surface of the closure to the fibrous board material. The advantage of employing a closure of this character in containers for lubricating oil will be obvious. The aluminum head or closure being a small fraction of the total material it is economical for the purpose and it may be more readily penetrated or pierced by the dagger-like tool which is conventionally used for opening cans now commonly used for oil.

A further modified form of closure cap which is suitable for fabrication from thin aluminum or similar material is illustrated in Figs. 21 to 24. In this form of the invention the cap 60 is shaped somewhat similar to the aluminum cap previously described. It is cut from a generally rectangular blank and is scored on lines 61 to provide a central panel 62 of substantially the same size as the open top of the container. Along two adjoining edges of the blank 60 the marginal portions of the blank extending between the crease line 61 and the edges of the blank are divided by score lines 63 into inner and outer flange forming sections 64 and 65. At three corners of the blank the material is cut or notched at 66 with the notches having blunt apexes 67 which extend inwardly and terminate short of the score lines 61. Along the other two margins of the blank the portions of the blank extending outside of the score lines 61 are divided into two sections 68, 69 by cutting lines 70 which extend inwardly but terminate short of the score lines 61. The section 69 extends outwardly somewhat beyond the edges of the section 68 and forms a pull tab for the dispensing opening. A diagonal score line 71 in the central panel 62 extending between the inner ends of the cutting lines 70 provides a fold line for the triangular corner section 72 which, together with the marginal sections 69, forms the dispensing flap portion of the closure which is opened to provide the pouring or dispensing opening. Score lines 73 divide the marginal portions 68, 69 of the blank in the other direction to permit formation of the same into attaching flanges when the blank is applied to the container's top. The corner of the opening portion 72 of the blank is cut out, or notched at 73' with the apex of the cut out portion extending short of the crease lines 61.

The closure blank 60 is applied to the top margin of the open container in the same manner as the closure blank 50 with the double flange forming portions at the margins of the blank being folded over the top edges of the side walls of the container. The forming and creasing irons used in the application of the closure cap provide a reinforcing groove formation 74 about the top of the container which extends into the edge of the tab or lip forming portion 69 but not across the same. At the corner between the tab sections 69 a relatively short groove formation 75 is impressed by the sealing irons to assist in retaining the members in position for reclosure of the dispensing flap. The sealing irons securely fasten and hermetically seal the flanges to the container walls.

The manner in which the cap may be opened to provide a dispensing opening is illustrated in Figs. 23 and 24, the lip forming portions or pull tabs 69 are pulled upwardly and inwardly across the top of the container causing the corner portion 72 of the container closure to fold or hinge about the crease line 71 leaving an opening 76 for dispensing the contents from the container, the corner of the body of the container serving as a pouring spout. The opening is readily closed by refolding the portion 72 and tabs 69 into their closed position.

A further modified form of the invention is shown in Figs. 25 to 32 in which a pouring opening is provided in the crossed central panels which form the initial closed end of the container. This form of container is fabricated from two generally rectangular blanks 80 and 81 which are cut and scored in a manner similar to that shown in connection with the container of Figs. 1 to 5.

The blank 80 (Fig. 25) is divided by longitudinally spaced parallel transverse score lines 82 into a central panel 83 and the end panels 84, the latter extending outwardly in the longitudinal direction of the blank from the score lines 82. The central panel 83 is defined along the other two sides by the parallel side edges 85 and the integral end panels 84 are defined along the two sides by the tapered side edges 86 of the blank. The central panel 83 is cut along the U-shaped line 87 to provide a tongue 88 extending in the longitudinal direction of the blank. The leg portions of the cutting line 87 are preferably joined at their ends by a transversally extending score line 89.

The companion blank 81 (Fig. 26) is generally rectangular in shape and divided by longitudinally spaced parallel transverse score lines 90 into a central panel 91 and end panels 92, the latter extending longitudinally from the score lines 90 to the ends of the blank. The central panel 91 is defined along the sides by score lines 93 and the end panels 92 are defined along the sides by tapered score lines 94 extending from the transverse score lines 90 to the ends of the blank. The score lines 93 and 94 along one side margin of the blank extend inwardly of the side edges of the blank which are parallel to the score line and which define with the score lines 93 and 94 side marginal flange forming portions 95 and 96 which are separated from each other by inwardly extending generally V-shaped notches 97 having blunt apexes 98 which terminate short of the score lines 93 and 94 and which are aligned at the ends of the transverse score lines 90. The other side edge of the blank is cut to provide a special flange section. Along the central panel 91 the major portion of the flange section is extended outwardly to form a projecting tab or flap 99 which is traversed near its outer side or end by a longitudinally extending score line 100 on the opposite face thereof. The side or transverse edges 101 of the flap 99 are extended inwardly in parallel relation to the transverse score lines 90 along perforated lines 102 permitting a tearing operation which will be subsequently described. The remaining portions 103 of the flange formation at the side of the panel 91 extend laterally of the blank a distance preferably somewhat less than the width of the opposite marginal flange portion 95 and is separated from the adjoining flange forming portions extending along the end panels 92 by notches 104 having blunt apexes 105. The adjoining flange formations which are extended or widened at the ends adjoining the notches 104 are divided into an inner portion 106 and outer portions 107 by a longitudinally extending score line 108 on the opposite side of the blank, the latter extending only partially the length of the flange. The outer portion 107 of the side flange formation is generally wedge shaped terminating at its inner end in a locking tab formation 109. The locking tab 109 presents at its inner end an abutment flange or edge 110 extending transversely of the blank and offset or spaced outwardly relative to the transverse score line 90. The central panel 91 and marginal flange portions of the blank are coated with a thermoplastic compound as indicated by the shading in Fig. 26.

In assembling and folding the blanks 80 and 81 the central areas 83 and 91 are first superimposed with the blanks in crossed relationship. The blanks may be conveniently assembled to form a container on a suitable mandrel indicated at 111 in Fig. 28, the innermost blank 80 being placed on the mandrel 111 with the central area 83 at the end of the mandrel and with the side wall forming panels 84 folded into engagement with opposite side faces of the mandrel. Paper blank 81 is thereafter folded to bring the side wall forming panels 92 into engagement with the adjoining faces of the mandrel. The side flange formations 95, 96 on the one side of blank 81 are then folded over into face engagement with the side wall forming panels 84 of the blank 80. The opposite side flanges of the blank 81 are folded into engagement with the outer faces of the panel 84, the tab forming portion 99 and adjoining portions being folded first against the panel 84 and side flange portions 106 and 107 being folded over on the face of the panel 84 so that the projecting portion or end of the tab 99 is partially beneath the projecting portion or locking tab formation 109 on the side flange 107. Heating and pressing tools are then applied to the flanges to activate the adhesive and seal the folded blanks in container forming relationship. The portions 107 of the side flanges and of tab 99 on which no adhesive is shown are not sealed to the side walls 84 and tab 99 is free to be grasped at its end and lifted and turned back for opening of the dispensing end of the container. As shown in Fig. 29 the superimposed panels 83 and 91 position the tongue or tab 88 relative to tab 99 so that the cutting line 87 of the tab 88 is completely sealed against the inner surface of the panel 91, the perforating lines 102 of the tab 99 extending parallel and in outwardly offset relation to the legs of the U-shaped cutting line 87.

The container when assembled and sealed as described may be closed after the filling operation by application of a closure cap to the open or filling end, such as the cap shown in Fig. 16.

The dispensing end of the container is initially hermetically sealed when the body of the container is formed and remains in closed and sealed condition (Fig. 30) until it is desired to dispense all or part of the contents. As shown in Figs. 31 and 32 the end portion of the opening tab 99 may be grasped and first bent outwardly and upwardly about the score line 100. A further pull on the tab 99 will release the side edges 101 from the locking tabs 109 after which the tab 99 may be lifted and torn loose along the lines 102, the inner tongue 88 remaining attached to the tab portion 99 and both elements bending about the score or fold line 112 which may be impressed in the panel 91 either before assembly or during the sealing operation. When it is desired to reclose the opening 113 which results from bending back the tab elements, the tab 99 is merely refolded into its initial position, being manipulated to insert the side edges beneath the locking tabs 109. This repositions the tab element 88 in the aperture 113 and effectively closes the container.

While specific materials and particular details of construction have been referred to in describing the illustrated forms of the invention it will be understood that other materials and other details of construction may be resorted to within the spirit of the invention.

I claim:

1. A paper container formed from two U-shaped inner and outer blanks, each blank defining a bottom and two side panels, said blanks being positioned in crossed superposed relation at the bottom of the blanks forming a container having a two ply bottom and single ply side walls, the outer blank only having continuous flanges along its side and bottom panels articulated thereto along continuous fold lines, said flanges overlapping the side edges of the side and bottom panels of the inner blank and secured thereto, the adjacent flanges of the bottom and side panels of said outer blank being mitred by a substantially right angle notch which terminates short of the adjacent articulated fold line wherein the material of the flange at the base of the notch is puckered and the edges of the notch forming the mitred joint are brought into abutting relation, the puckered portion being flattened into the plane of the abutting flange portions wherein a liquid tight joint is formed between the two blanks at each junction of the base or bottom and side panels.

2. A paper container formed from two U-shaped inner and outer blanks, each blank defining a rectangular bottom and two side panels having outwardly tapering side edges and rectangular shaped end flaps, said blanks being positioned in crossed superposed relation at the bottom of the blanks forming a container having a two ply bottom and single ply side walls that are tapered so that like empty containers may be nested together each into the other, the outer blank only having continuous flanges along its side and bottom panels articulated thereto along continuous fold lines, said flanges overlapping the side edges of the side and bottom panels of the inner blank and secured thereto, the adjacent flanges of the bottom and side panels of said outer blank being mitred by a near right angle notch which terminates short of the adjacent articulated fold line wherein the material of the flange at the base of the notch is puckered and the edges of the notch forming the mitred joint are brought into abutting relation, the puckered portion being flattened into the plane of the abutting flange portions wherein a liquid tight joint is formed between the two blanks at each junction of the base or bottom and side panels, said flattened puckered portions facilitating close nesting together of like empty containers, and after filling the container, closing the open end thereof with means that is provided by said side panel end flaps.

3. A container of sheet material and formed from two U-shaped inner and outer blanks, each blank defining a bottom and two side panels, said blanks being positioned in crossed superposed relation at the bottom of the blanks forming a container having a two ply surface secured flat bottom end closure and single ply side walls, the outer blank only having continuous flanges along its side and bottom panels articulated thereto along continuous fold lines, said flanges overlapping the side edges of the side and bottom panels of the inner blank and secured thereto, the adjacent flanges of the bottom and side panels of said outer blank being mitred by a substantially right angle notch which terminates short of the adjacent articulated fold line wherein the material of the flange at the base of the notch is puckered and the edges of the notch forming the mitred joint are brought into abutting relation, an upper marginal portion of said flanges adjacent the converging corner edges of said bottom and side panels including the puckered portions being pressed inwardly wherein the puckered portions are flattened into the plane of the inwardly pressed marginal portions and wherein a liquid tight joint is formed between the two blanks at each junction in general of the base or bottom formed end closure and side walls.

4. A container as set forth in claim 3 wherein said puckered portions are provided with inner surface coating of adhesive that is extended from surfaces of said secured two ply bottom and overlapping flanges, said adhesive providing means that augments the pressure applied in securing said flattened puckered portions in the plane of said marginal portions.

5. A container corner forming blank portion comprising a sheet having a longitudinal score line and a transverse score line intersecting the longitudinal score line in right angular relation and defining therewith an end wall area and a side wall area to one side of the longitudinal score line and two side wall areas at the other side of the score line, said two side wall areas being separated by a notch centered on the transverse score line and defined by converging edges bearing such angular relation as to intersect at the point of intersection of the longitudinal and transverse score lines and a blunt base spaced outwardly from said point of intersection to provide a substantial area of blank stock between the blunt base and the longitudinal score line, and having the end wall area and the side wall area lying at opposite sides of the transverse score line bent along said line into approximately right angular relation, and the side wall area lying at the other side of the longitudinal score line bent along said longitudinal score line to bring the side wall areas into coplanar relation and the notch defining converging edges into abutting relation and cause the area of blank stock between the blunt base of the notch and the longitudinal score line to pucker outwardly to define an imperforate corner, said pucker of blank stock being substantially obliterated by compression thereof in the said plane of the side wall area.

6. A container corner forming blank portion comprising a sheet having a longitudinal score line and a transverse score line intersecting the longitudinal score line in right angular relation and defining therewith an end wall area and a side wall area to one side of the longitudinal score line and two side wall areas at the other side of the score line, said two side wall areas being separated by a notch centered on the transverse score line and defined by converging edges bearing such angular relation as to intersect at the point of intersection of the longitudinal and transverse score lines and a blunt base spaced outwardly from said point of intersection to provide a substantial area of blank stock between the blunt base and the longitudinal score line, and having the end wall area and the side wall area lying at opposite sides of the transverse score line bent along said line into approximately right angular relation, and the side wall areas lying at the other side of the longitudinal score line bent along said longitudinal score line to bring the side wall areas into coplanar relation and the notch defining converging edges into abutting relation and cause the area of blank stock between the blunt base of the notch and the longitudinal score line to pucker outwardly to define an imperforate corner, said pucker of blank stock being substantially obliterated by compression thereof against and into the edge abutting side wall portions.

7. A container corner forming blank portion comprising a sheet having a longitudinal score line and a transverse score line intersecting the longitudinal score line in right angular relation and defining therewith an end wall area and a side wall area to one side of the longitudinal score line and two side wall areas at the other side of the score line, said two side wall areas being separated by a notch centered on the transverse score line and defined by converging edges bearing such angular relation as to intersect at the point of intersection of the longitudinal and transverse score lines and a blunt base spaced outwardly from said point of intersection to provide a substantial area of blank stock between the blunt base and the longitudinal score line, and having the end wall area and the side wall area lying at opposite sides of the transverse score line bent along said line into approximately right angular relation, and the side wall areas lying at the other side of the longitudinal score line bent along said longitudinal score line to bring the side wall areas into coplanar relation and the notch defining converging edges into abutting relation and cause the area of blank stock between the blunt base of the notch and the longitudinal score line to pucker outwardly to define an imperforate corner, said pucker of blank stock being substantially obliterated by compression thereof against and into the edge abutting side wall portions, and there being included another side wall area over which the edge abutting side wall portions are superimposed and against which they are bonded to provide an hermetic seal.

References Cited in the file of this patent

UNITED STATES PATENTS

| | | |
|---|---|---|
| 1,737,319 | McDonald | Nov. 26, 1929 |
| 1,899,311 | Cassell | Feb. 28, 1933 |
| 2,084,106 | Palmer et al. | June 15, 1937 |
| 2,186,973 | Hothersall | Jan. 16, 1940 |
| 2,234,167 | Hothersall | Mar. 11, 1941 |
| 2,276,577 | Hahn | Mar. 17, 1942 |
| 2,323,505 | Wilcox | July 6, 1943 |
| 2,341,379 | Housholder et al. | Feb. 8, 1944 |
| 2,399,241 | Merkle | Apr. 30, 1946 |
| 2,452,952 | Palmer | Nov. 2, 1948 |
| 2,470,984 | Horning et al. | May 24, 1949 |
| 2,530,787 | Sanford | Nov. 21, 1950 |
| 2,611,527 | Fisher | Sept. 23, 1952 |
| 2,704,179 | Wilcox | Mar. 15, 1955 |

FOREIGN PATENTS

| | | |
|---|---|---|
| 485,040 | Great Britain | May 13, 1938 |
| 515,359 | Great Britain | Dec. 4, 1939 |
| 728,337 | Germany | Nov. 25, 1942 |